(12) United States Patent
Zhang et al.

(10) Patent No.: US 9,490,043 B2
(45) Date of Patent: Nov. 8, 2016

(54) HIGHLY CONDUCTIVE ELECTRICALLY CONDUCTIVE ADHESIVES

(75) Inventors: Rongwei Zhang, Atlanta, GA (US); Ching-Ping Wong, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 1157 days.

(21) Appl. No.: 13/403,943

(22) Filed: Feb. 23, 2012

(65) Prior Publication Data

US 2013/0056689 A1  Mar. 7, 2013

Related U.S. Application Data

(60) Provisional application No. 61/445,679, filed on Feb. 23, 2011.

(51) Int. Cl.
- *H01B 1/22* (2006.01)
- *C09J 9/00* (2006.01)
- *C09J 9/02* (2006.01)

(52) U.S. Cl.
CPC .. *H01B 1/22* (2013.01); *C09J 9/02* (2013.01)

(58) Field of Classification Search
CPC ............ H01B 1/00; H01B 1/02; H01B 1/22; C09J 9/02
See application file for complete search history.

(56) References Cited

U.S. PATENT DOCUMENTS

| | | | |
|---|---|---|---|
| 2006/0081819 A1* | 4/2006 | Li et al. | 252/500 |
| 2009/0294734 A1* | 12/2009 | Yang et al. | 252/500 |
| 2010/0001237 A1* | 1/2010 | Fornes et al. | 252/500 |

* cited by examiner

*Primary Examiner* — Mark Kopec
(74) *Attorney, Agent, or Firm* — Troutman Sanders LLP; Ryan A. Schneider; Troy S. Kleckley

(57) ABSTRACT

The present invention provides for a relatively simple method to decrease the electrical resistivity of conductive adhesives by in-situ nanoparticle formation and sintering using a reducing agent. The reducing agent was found to cause sintering within the conductive adhesive by facilitating the reduction of the silver salts of fatty acids on the surface of silver flakes, leading to the formation of nano-/submicron-silver necks. These silver necks bridge neighboring silver flakes, decreasing the contact resistance between flakes within the conductive adhesives. The reducing agent also removes at least a portion of the lubricant commonly found on silver flakes used in conductive adhesives, thus reducing the tunneling resistance between the silver flakes.

19 Claims, 22 Drawing Sheets

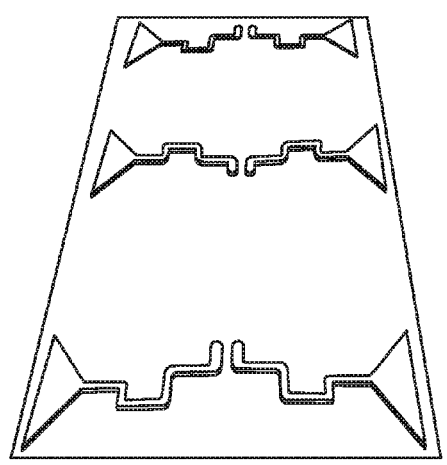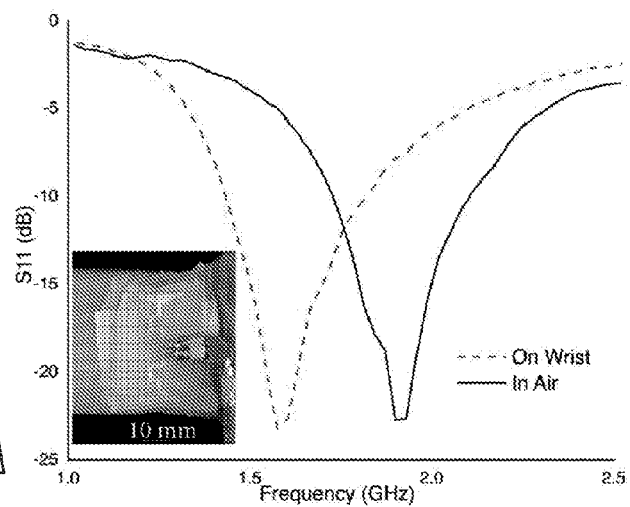
FIG. 18A
FIG. 18B

HIGHLY CONDUCTIVE ELECTRICALLY CONDUCTIVE ADHESIVES

CROSS-REFERENCE TO RELATED APPLICATIONS

This application claims the benefit of U.S. Provisional Application No. 61/445,679 filed 23 Feb. 2011, the entire contents and substance of which are hereby incorporated by reference.

BACKGROUND OF THE INVENTION

1. Field of the Invention

This invention relates generally to the field of conductive polymers.

2. Description of Related Art

Printed electro-active composites are emerging as a useful class of materials to fabricate ultra-low cost disposable consumer electronic devices. The tunable properties and processability of electro-active composite materials make them suitable for use in photovoltaics, transistors, displays, batteries, radio frequency devices, and sensors. Furthermore, the ability of electro-active composite materials to be printed and processed at low temperatures enables printing of components directly on unmodified paper or textiles with minimal impact on function or form factor. Using these printable materials, functional electronic components, including thermochromic displays, cellulose based batteries, antennas and disposable radio frequency identification (RFID) tags have been produced on low cost textiles and paper.

All electronic devices require electrodes to provide power, signal and ground to active and passive components. Printed conductive materials are fundamental to the development of printed electronic devices. Current materials for printed conductors can be stratified into two categories: low temperature sinterable nano-inks and epoxy-based electrically conductive composites (ECC). However, both of these methods to print conductors have their limitations. Sinterable nano-inks have low resistivity ($\sim 2 \times 10^{-6}$ to $\sim 5 \times 10^{-5}$ $\Omega$cm), but have insufficient abrasion resistance, adhesion and are typically too expensive for low cost applications. On the other hand, ECCs are relatively lower in cost and have excellent adhesion and abrasion resistance, but have relatively high resistivity ($10^{-4}$-$10^{-3}$ $\Omega$cm) at filler loading of 80 wt %. The relatively high resistivity of ECC results from minimal contacts between conductive fillers. This high resistivity of conventional epoxy-based composites makes them inefficient for uses in conventional low powered, high performance or high frequency devices.

Furthermore, the preparation of flexible highly conductive interconnect materials at low temperatures (preferably 150° C. or below) is important for the future of low-cost flexible electronics. The popularity of flexible circuits and building electronic devices on flexible substrates requires the interconnect materials to be mechanically compliant and highly conductive. Low processing temperatures of the interconnect materials are also required to enable the wide use of low cost, flexible substrates such as paper and polyethylene terephthalate (PET). Flexible conductive polydimethylsiloxane (PDMS) composites have been developed for various microelectronic applications, owing to the unique physical and chemical properties of PDMS. These properties include relatively superior elasticity and flexibility, optical transparency, biocompatibility and stable physical and chemical properties over a wide range of temperatures from $-50°$ C. to $+200°$ C.

The resistivity of PDMS filled with 80 wt % bimodal distribution of micron-sized silver flakes is about $7 \times 10^{-4}$ $\Omega$cm. A lower point of resistivity of $2 \times 10^{-4}$ $\Omega$cm for PDMS filled can be realized with 80 wt % silver particles, but the resistivity levels off even after increased filler loading. This high resistivity of PDMS-based conductive composites translates into large losses and low efficiency, especially at high frequency. Another limitation of flexible conductive PDMS composites lies in the poor adhesion on metal surfaces due to the low surface energy of PDMS. This further limits their wide application as a flexible interconnect material.

The resistivity of a conductive polymer composite is determined by the composite composition (such as filler loading), the surface properties of conductive fillers (such as the presence of a thin layer of lubricant or oxide film on the surface of silver flakes), physiochemical properties of polymer matrix (such as cure shrinkage and the interaction between the polymer matrix and conductive fillers), interlayer thickness, temperature, processing conditions of conductive polymer composites, etc. The resistance of conductive polymer composites is the sum of filler resistances ($R_f$) and inter-particle contact resistances ($R_c$). The contact resistance is composed of constriction resistance and tunneling resistance. Constriction resistance occurs because the current must squeeze through the small area of contact. Tunnel resistance is due to an intermediate layer between conductive fillers.

In conductive polymer composites, conductive fillers can be separated by a thin layer of polymer, oxide or lubricant for most commercial silver flakes which have been extensively used for the preparation of highly conductive polymer composites. The thickness of the interface can vary from 10 to 100 Å, depending on the physiochemical properties of the polymer matrix, filler, filler concentration, and the conditions of composite preparation. Relatively low conductivity of conductive polymer composites such as conductive PDMS composites results from physical contact, instead of metallurgical joints, between conductive fillers.

Reducing or even eliminating the contact resistance between conductive fillers is an important aspect for the preparation of highly conductive polymer composites. Therefore, new interconnect materials with low electrical resistivity, good adhesion, flexibility and low processing temperatures are desired for electronic applications.

BRIEF SUMMARY OF THE INVENTION

Briefly described, in exemplary form, the present invention comprises a method for improving the electrical conductivity of polymer composites. The polymer composites typically comprise of a thermoset polymer (such as an epoxy resin), curing agent (such as anhydride), catalyst, commercially available micro-sized silver flakes and other additives. A thin layer of lubricant, i.e. silver salt of fatty acid or silver carboxylate, is typically present on the surface of commercial silver flakes. The lubricant prevents the aggregation of silver flakes during production and improves the dispersion of silver flakes in an epoxy resin. However, the presence of this thin layer of lubricants prevents the metal-metal contact among silver flakes, decreasing the electrical conductivity.

An exemplary method of the present invention comprises in situ reduction of the lubricant (silver carboxylate) on the surface of silver flakes by adding a reducing agent. The reducing agent can be an additive or a flexible epoxy with reduction capability. The reducing agent helps to cause surface reactive nano/submicron-sized particles to form during the curing phase of an epoxy. At room temperature, the mixing of the reducing agent with silver flakes in the formulation does not reduce the silver carboxylate. Thus, the silver flakes in the epoxy resin can be dispersed as intended and desired at room temperature. As the temperature increases during curing, silver carboxylate present on the silver flakes are reduced to form silver nano/submicron-sized particles.

The reduction of the silver salts of fatty acids causes the simultaneous debonding of the surfactant and growth of colloidal silver nanoparticles. The nanoparticles formed on the surface of the silver flakes can be uniformly dispersed and surfactant free. The nanoparticles are surfactant free with a higher surface energy than pre-fabricated nanoparticles, which are stabilized by surfactants. The high surface energy of these in-situ formed particles makes them thermodynamically unstable. As a result, the nanoparticles spontaneously sinter with neighboring silver flakes. The sintering leads to the formation of metallurgical joints, which reduces, or even eliminates, the contact resistance. The method can further involve the removal of the silver flake surface lubricant and reduction of silver oxide, which enables direct metal-metal contacts between the silver flakes, decreasing the contact resistance further. The reduction in contact resistance translates to a significant increase in electrical conductivity of polymer composites such as ECC.

Various embodiments of the present invention can achieve sintering of conductive fillers without the incorporation of pre-fabricated nanoparticles to achieve relatively high conductivity, facile processing, and large throughput. Various embodiments of the present invention disclose a simple, cost-effective and highly processable approach to create highly conductive sintered ECC without the inclusion of pre-fabricated nanoparticles by sintering micron-sized Ag flakes at low temperatures (150° C. or below).

One embodiment of the present invention is a method for in situ preparation of a conductive adhesive comprising an epoxy resin, curing agent, catalyst (typically 1 wt %), 80 wt % silver flakes and a few percentage of ethylene glycol (EG). Without EG, the electrical resistivity of the composite was $1.3(\pm 0.5) \times 10^{-3}$ Ωcm. As the weight percentage of EG increases, the resistivity decreases. The ECC with 5 wt % EG has a resistivity of $5.3(\pm 1.9) \times 10^{-5}$ Ωcm, 3.86% of the resistivity of ECC without EG. The measured resistivity is about one order of magnitude lower than commercial conductive polymer composites filled with similar filler loadings of 80 wt % Ag flakes. In some further embodiments, the reducing agent is selected from the group consisting of glycerol and polyethylene glycol with different molecular weights (Mw=400-1000).

Another embodiment of the present invention is a method for in situ preparation flexible conductive adhesive having a plurality of silver flakes and surface reactive silver nano/submicron-sized particles on at least a portion of a surface and/or an edge of a least a portion of the plurality of silver flakes, wherein at least a portion of the surface reactive silver nano/submicron-sized particles are sintered with a portion of the silver flakes to form metallurgical joints between at least a portion of the silver flakes. In some embodiments, a portion of surface lubricant is removed from at least a portion of the surface of the plurality of silver flakes. In the embodiment, a flexible epoxy with reduction capability is selected from the group consisting of diglycidyl ether of polypropylene glycol and diglycidyl ether of polyethylene glycol.

A still further embodiment of the present invention comprises a method making a conductive adhesive comprising a polymer matrix and a plurality of silver flakes. The method comprises adding a reducing agent to grow surface reactive silver nano/submicron-sized particles on at least a portion of a surface of and/or an edge of a least a portion of the plurality of silver flakes to facilitate in-situ sintering between a portion of the plurality of silver flakes, and forming metallurgical joints between at least a portion of the silver flakes. The method can further comprise removing at least a portion of surface lubricant from at least a portion of the surface of the plurality of silver flakes.

In some embodiments, the reducing agent is an additive or flexible epoxy with reduction capability. The additive can be selected from the group consisting of ethylene glycol, glycerol and polyethylene glycol. In some embodiments, the weight % of the additive is in the range of 0.5-10 wt %.

In some embodiments, the flexible epoxy is selected from the group consisting of diglycidyl ether of polypropylene glycol and diglycidyl ether of polyethylene glycol. In some embodiments, the weight % of the flexible epoxy is in the range of 5-20 wt %.

In still further embodiments, the method further comprises curing the polymer matrix at a temperature range of approximately 150° C. to approximately 200° C. The curing time can be from approximately 30 minutes to approximately 1 hour.

In some embodiments, the weight % of the plurality of silver flakes in the polymer composite is in the range of 60-90 weight %, more preferable in the range of 70-85 wt % and most preferably at 80 wt %.

An additional embodiment of the present invention is a conductive adhesive polymer composite. The conductive adhesive polymer composite comprises a plurality of silver flakes, surface reactive silver nano/submicron-sized particles created by the addition of a reducing agent, wherein the surface reactive silver nano/submicron-sized particles are on at least a portion of a surface and/or an edge of a least a portion of the plurality of silver flakes, and wherein at least a portion of the surface reactive silver nano/submicron-sized particles are sintered with a portion of the silver flakes to form metallurgical joints between at least a portion of the silver flakes.

In some embodiments, a portion of surface lubricant is removed from at least a portion of the surface of the plurality of silver flakes.

In further embodiments, the reducing agent is an additive or flexible epoxy. The additive can be is selected from the group consisting of ethylene glycol, glycerol and polyethylene glycol.

In some embodiments, the weight % of the additive is in the range of 0.5-10 wt %. In further embodiments, the flexible epoxy is selected from the group consisting of diglycidyl ether of polypropylene glycol, and diglycidyl ether of polyethylene glycol. In some embodiments, the weight % of the flexible epoxy is in the range of 5-20 wt %.

In still further embodiments, the conductive adhesive polymer composite can comprise a plurality of silver flakes, wherein the weight % of the plurality of silver flakes in the conductive adhesive polymer composite is in the range of 60-90 weight %, more preferable in the range of 70-85 wt % and most preferably at 80 wt %.

In some further embodiments, the conductive adhesive is stencil printable or the conductive adhesive is a flexible composite.

These and other objects, features and advantages of the present invention will become more apparent upon reading the following specification in conjunction with the accompanying drawing figures.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and furthermore, are not intended in any manner to limit the scope of the presently disclosed subject matter.

FIG. 18A is a picture of an array of stencil-printed antenna.

FIG. 18B illustrates an S11 measurement result showing the effect of placing the band-aid antenna on the human body.

DETAILED DESCRIPTION OF THE INVENTION

Figure 1:
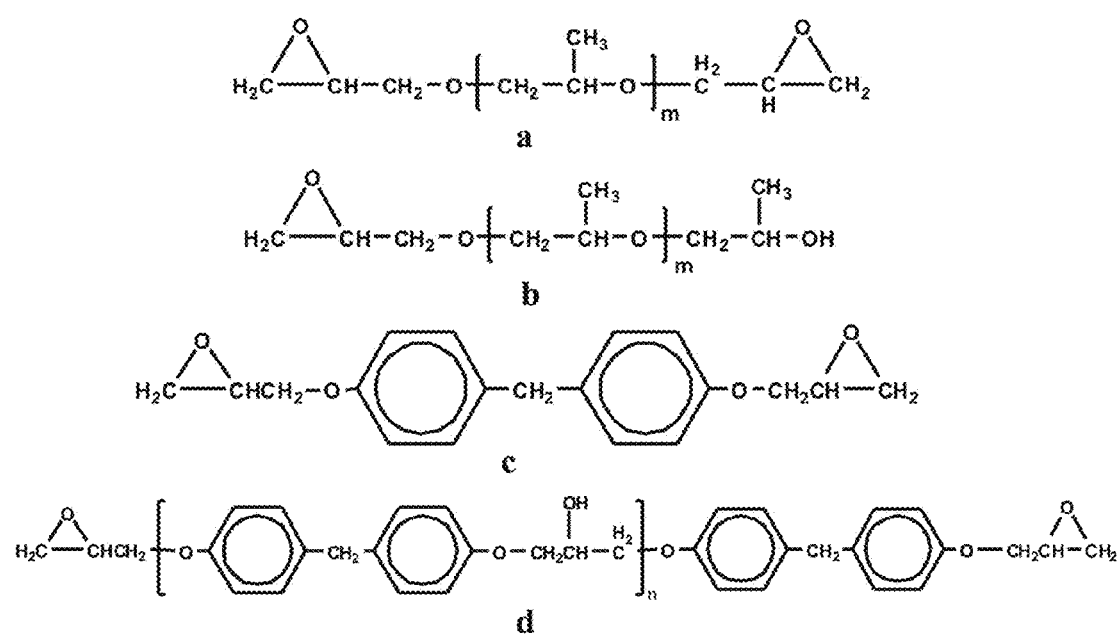
FIG. 1 illustrates the molecular structures of diglycidyl ether of polypropylene glycol (DGEBF) and diglycidyl ether of bisphenol F (DGEBF).

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Disclosed are methods that enable the formation of metallurgical joints between silver flakes within a polymer matrix by incorporating a reducing agent as an additive or a flexible epoxy with reduction capability that leads to relatively flexible, relatively highly conductive polymer composites. In some embodiments, the present invention involves in situ reduction of silver carboxylate present on the surface of silver flakes by a reducing agent such as diglycidyl ether of polypropylene glycol (DGEPG) to form nano/submicron-sized silver particles, preferably both on the surface of and at the edge of silver flakes. The present invention is not limited to DGEPG, as other suitable reducing agents can be used, including, but not limited to, ethylene glycol, glycerol, polyethylene glycol with $M_w$=400-1000, and diglycidyl ether of polyethylene glycol.

The in situ formed nano/submicron-sized silver particles, due to high surface area-to-volume ratios and lack of strong capping agents, are highly surface reactive. This results in low temperature sintering between silver flakes during curing. Sintering enables the formation of metallurgical joints and reduces or even eliminates the contact resistance among the conductive fillers, increasing the conductivity of the conductive polymer composites. In some embodiments, the reducing agent added also removes lubricant and silver oxide present on the surface of the silver flakes, reducing the resistivity even further.

Laboratory Experiments and Results (I)

Figure 2:
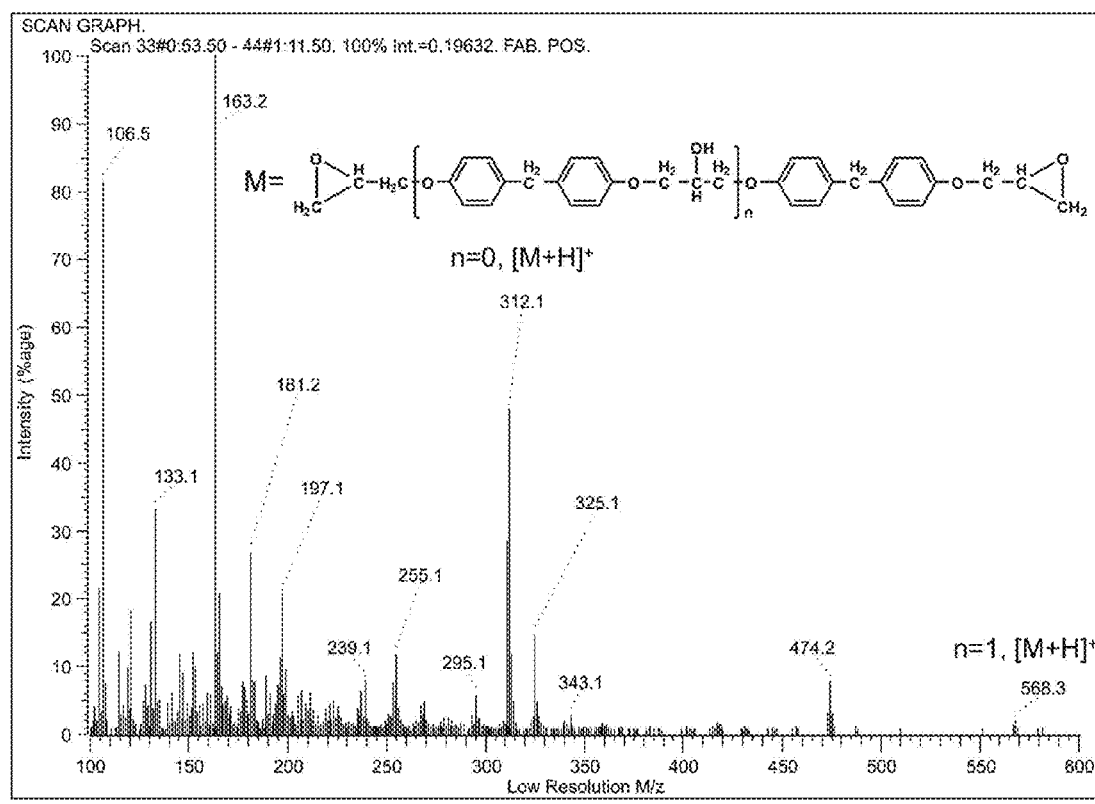
FIG. 2 is a mass spectrum of DGEPG analyzed by fast atom-bombardment-mass spectrometry using thioglycerol as a matrix.

Epoxy resins that can be used include, but are not limited to, diglycidyl ether of polypropylene glycol (DGEPG, D.E.R. 732, Dow Chemical) or diglycidyl ether of bisphenol F (DGEBF, EPON 862, Shell Chemical Co.), illustrated in FIG. 1. DGEPG has a much lower viscosity (60-70 mPas) than DGEBF (2500-4500 mPas). Molecular structures of the epoxy resins were verified by Mass Spectrometry, as shown in FIG. 2. The mass spectrum of DGEBF was analyzed by fast atom bombardment-mass spectrometry (FAB-MS) using thioglycerol as a matrix. The mass spectrum of DGEPG was collected with the Voyager 4700 MALDI-TOF-TOF system (ABI) operated in reflector mode. Alpha-Cyano-4-hydroxycinnamic acid (CHCA) was used as a matrix for MALDI. The curing agent was hexahydro-4-methylphthalic anhydride (HMPA) or 1-cyanoethyl-2-ethyl-4-methylimidazole (2E4MZ-CN, Shikoku Chemicals Corp.) Two silver flakes with different sizes and surface lubricants (Ag-FA and Ag-FB, Ferro Corp.) were used to improve the packing density and adjust the viscosity of the formulated paste.

An epoxy resin (DGEBF or DGEPG) was mixed with silver flakes and then heated at 150° C. for 10 or 30 min. The silver flakes appeared to have lost their luster and the surface appeared dull after being treated with DGEPG, while no significant change of surface appearance was observed for silver flakes treated with DGEBF. Acetone was added to the mixture and the resulting mixture was centrifuged. After removal of the supernatant, the silver flakes were re-dispersed in acetone. Five cycles of dispersing and centrifugation were used in an effort to remove the residual epoxy resin. The lubricant on the surface of silver flakes was hardly washed off by acetone during the process. Finally, the silver flakes were dried in vacuum before the characterization.

Different ratios of DGEBF and DGEPG were mixed with 80 wt % silver flakes (Ag-FA and Ag-FB with a mass ratio of 1:1), HMPA and the catalyst. Two strips of a Kapton tape (Dupont) were applied onto a pre-cleaned glass slide. The formulated pastes were printed on the glass slide. Then, the pastes were thermally cured at 150° C. in air for 1 hour. To show flexibility of conductive polymer composites, the formulated pastes were printed on the surface of polyethylene terephthalate. After curing, the samples were bended conformally to the surface of cylinders with different radii to measure the resistivity change under bending condition.

After curing, bulk resistances (R) of polymer composite strips were measured by a Keithley 2000 multimeter. The widths and lengths of the specimens were measured by digital caliber (VWR). The thickness of the specimen was measured by Heidenhain (thickness measuring equipment, ND 281B, Germany). Bulk resistivity, $\rho$, was calculated using $\rho$=Rtw/l, where l, w, t are the length, width and thickness of the sample, respectively.

Weight loss of silver flakes during heating in air was studied using thermogravimetric analyzer (TGA, TA Instruments, model 2050). The heating rate was 20° C./min. Morphologies of the treated silver flakes and the polymer composites were studied by field emission scanning electron microscopy (SEM, LEO 1530). Decomposition of the lubricants on the surface of silver flakes was studied by differential scanning calorimetry (DSC, TA Instruments, Q100). The heating rate was 10° C./min. Raman spectra were obtained by using a LabRAM ARAMIS Raman confocal microscope (HORIBA Jobin Yvon) equipped with a 532 nm diode pumped solid state (DPSS) laser. Si wafer was used as a substrate for Raman measurements.

Figure 3:
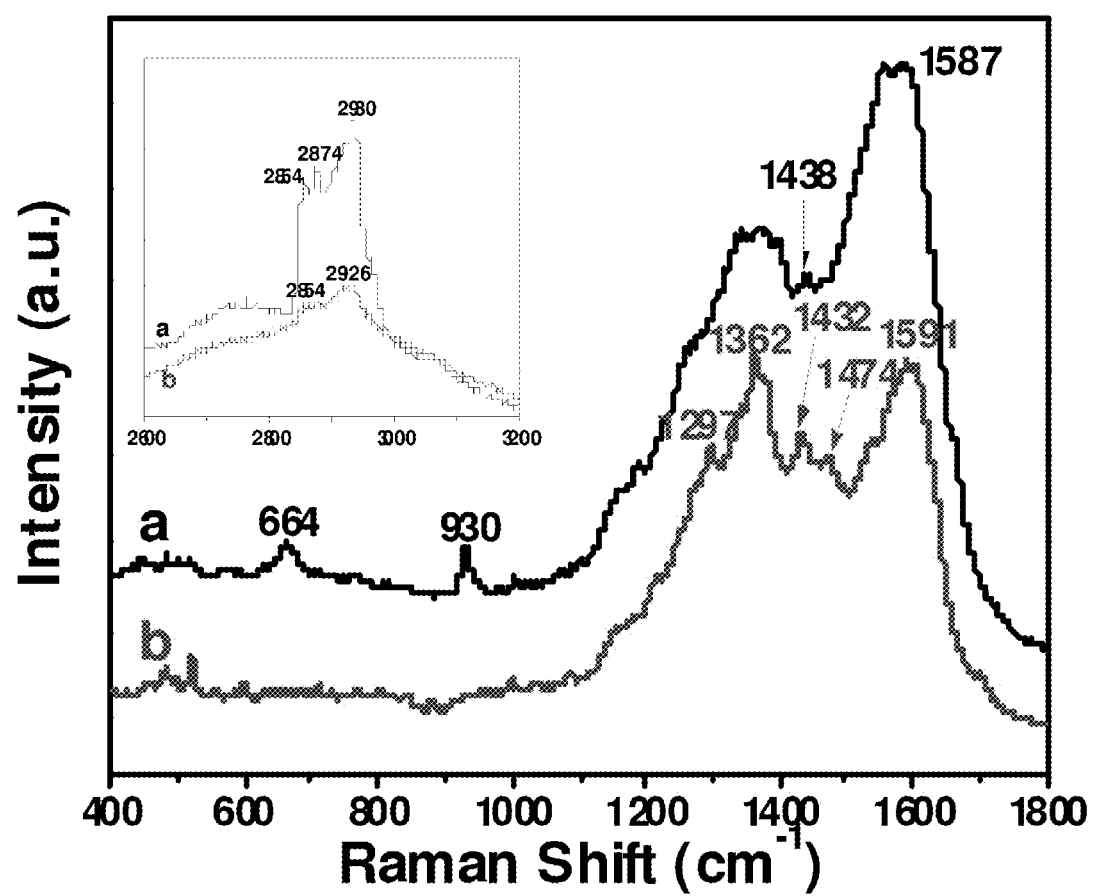
FIG. 3 are Raman spectra of the lubricant on the surface of (a) Ag-FA and (b) Ag-FB. Inset is the spectra in the range of 2800-3200 $cm^{-1}$.

As previously mentioned, a thin layer of lubricant is typically present on the surface of commercial silver flakes to prevent the aggregation of silver flakes during production. This layer of lubricant affects the interaction of silver flakes with other silver flakes and with the polymer system, and thus, affects the dispersion of silver flakes, the rheology of formulated pastes, and the electrical conductivity of the resulting polymer composites. FIG. 3 shows Raman spectra of the lubricant on the surface of silver flakes. The presence of carboxylate groups on the surface of silver flakes was verified by the symmetric ($v_s$(COO$^-$)) stretching at 1432 cm$^{-1}$ (or 1438 cm$^{-1}$) and asymmetric ($v_{as}$(COO$^-$)) stretching at 1591 cm$^{-1}$ (or 1587 cm$^{-1}$). This result is consistent with previous studies that the lubricant layer is indeed silver carboxylate. The distinct differences between the two spectra were i) the intensity of the peaks at 930 and 664 cm$^{-1}$ in FIG. 3, data set (a), assigned to the C—COO$^-$ stretching and the deformation of —COO$^-$, was much stronger than that of the corresponding peaks in FIG. 3, data set (b).

The SERS peaks of C—H stretching of the lubricant on Ag-FA were well resolved, compared with those of the lubricant on Ag-FB, as shown in FIG. 3, inset. Methylene twisting, wagging and scissor appeared at 1297, 1362 and 1474 cm$^{-1}$, respectively in FIG. 3, data set (b). The intensity of these peaks was much stronger than that of the corresponding peaks in FIG. 3, data set (a). These distinct differences are related to the chain length of lubricants and their surface orientation and conformation.

Figure 4:
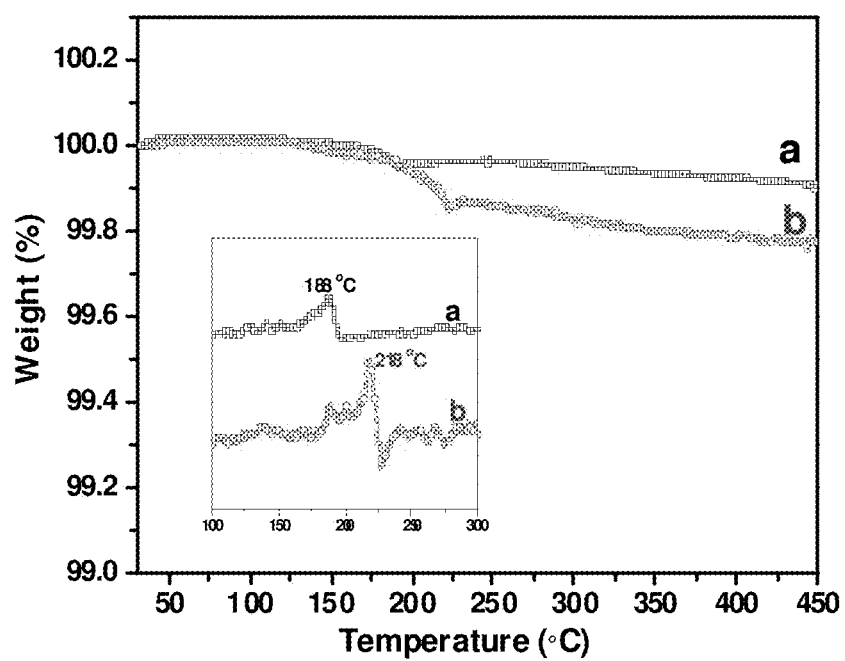
FIG. 4 thermogravimetric analyzer graph of (a) Ag-FA and (b) Ag-FB. The inset is the first derivative of curve a and b in the temperature range of 100-300° C.
Figure 5:
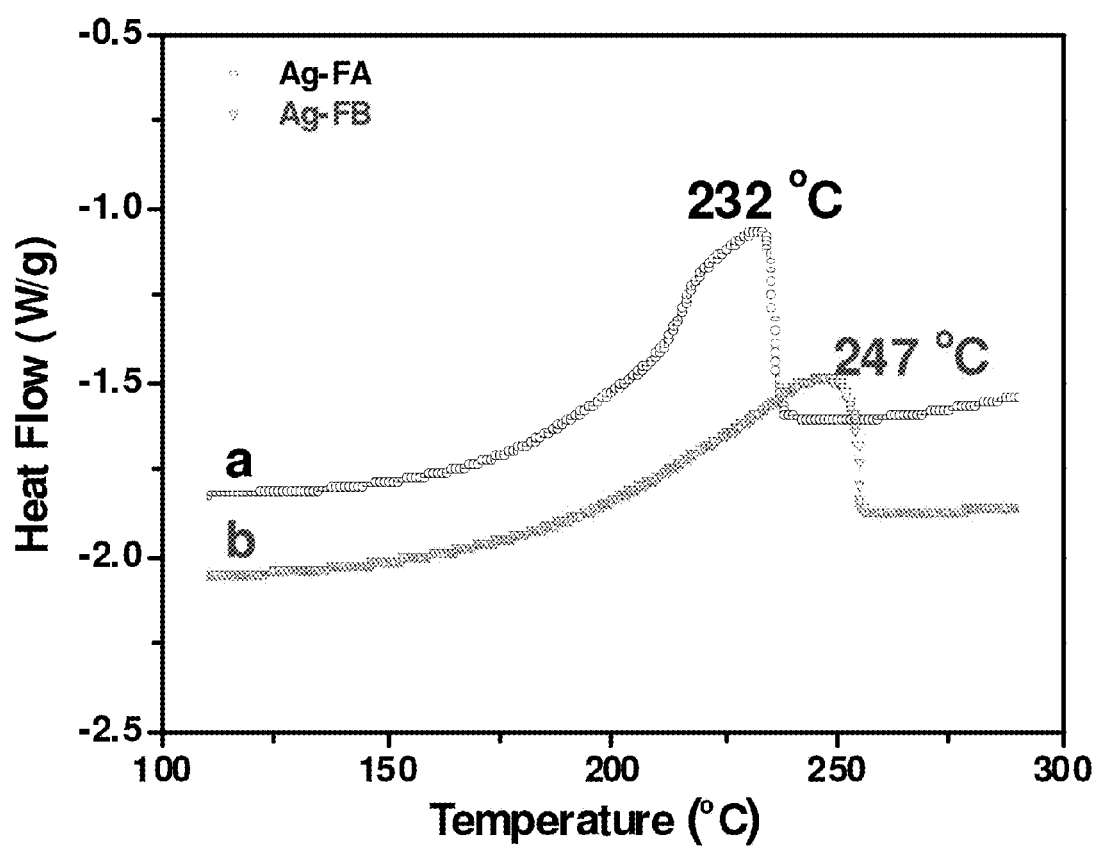
FIG. 5 is a differential scanning calorimetry graph of (a) Ag-FA and (b) Ag-FB.

FIG. 4 shows TGA results of the silver flakes. Ag-FA and Ag-FB showed significant weight losses at 188° C. and 218° C., respectively, as shown in FIG. 4, inset. This indicates the presence of lubricants on the surface of silver flakes. Weight losses of Ag-FA and Ag-FB at 450° C. were 0.09% and 0.23%, respectively. Both Ag-FA and Ag-FB showed endothermic peaks at 232 and 247° C., respectively, as shown in FIG. 5. It is understood that silver flakes lubricated with fatty acids of a longer chain show exothermic DSC peaks at higher temperatures. These exothermic DSC peaks in air of lubricated silver flakes are due to the oxidation of the lubricant layer. These results indicated that the lubricant on the surface of Ag-FB can have a longer chain than that on Ag-FA.

Figure 6:
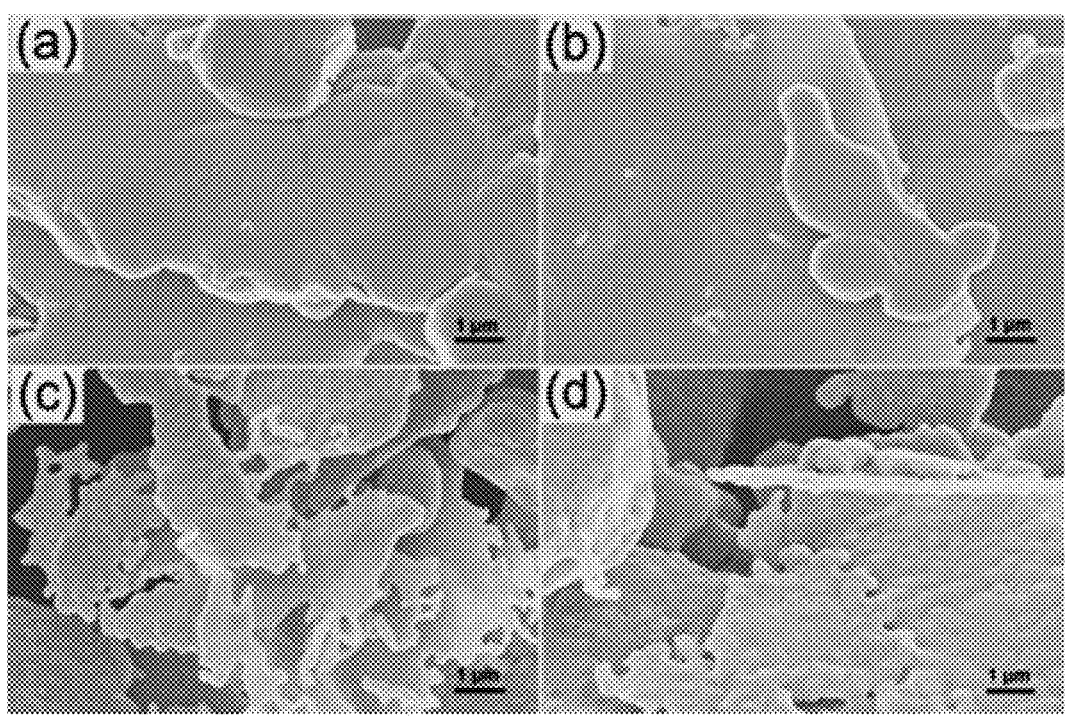
FIG. 6 are scanning electron microscope images of Ag-FA treated with DGEBF for (a) 10 min, (b) 30 min and with DGEPG for (c) 10 min, (d) 30 min at 150° C.
Figure 7:
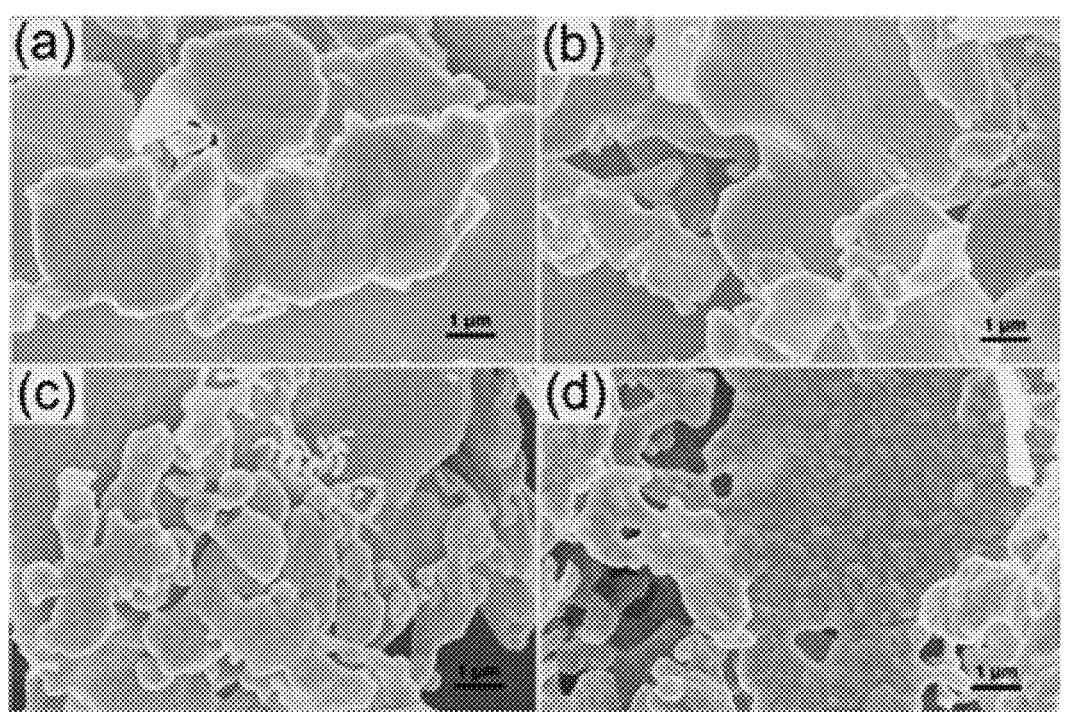
FIG. 7 are scanning electron microscope images of Ag-FB treated with DGEBF for (a) 10 min, (b) 30 min and with DGEPG for (c) 10 min, (d) 30 min at 150° C.

To investigate the reduction of silver carboxylate and the formation of silver particles on the surface of silver flakes, Ag-FA and Ag-FB were treated with DGEBF and DGEPG at the curing temperature (150° C.). FIGS. 6 and 7 show the surface morphology changes of silver flakes after isothermal treatment. When treated with DGEBF at 150° C. for 10 min, the surface of silver flakes remained relatively smooth, as shown in FIGS. 6a and 7a. Compared with silver flakes treated with DGEBF, silver flakes treated with DGEPG showed growth of silver nano/submicron-sized particles on their surfaces and at their edges, as shown in FIGS. 6c and 7c. As the time for treatment increased, silver flakes treated with DGEBF became rough, as shown in FIGS. 6b and 7b.

The relatively rough surface is the result of the reduction of silver carboxylate and the formation of highly surface reactive silver nano/submicron-sized particles. These particles then sintered with the silver flakes. The growth of silver nano/submicron-sized particles was more prominent when silver flakes were treated with DGEPG for 30 min, as shown in FIGS. 6d and 7d. Moreover, neckings between silver flakes were observed. The neckings between silver flakes are indicative of effective sintering between silver flakes. This can result from the relatively stronger reduction capability of the primary —OH group in DGEPG than secondary —OH group in DGEBF at 150° C.

Figure 8:
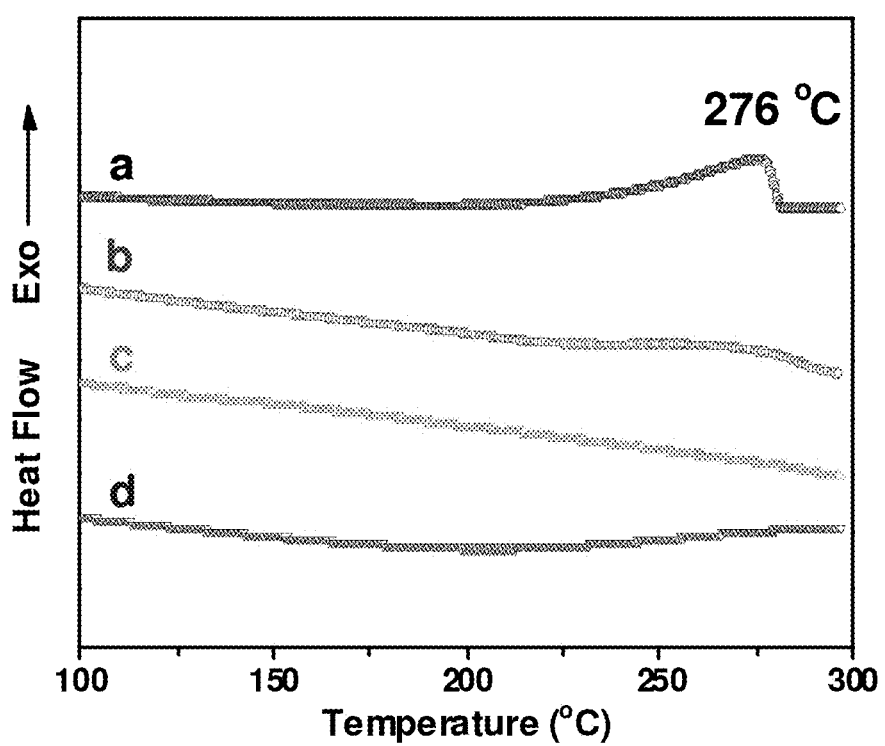
FIG. 8 is a differential scanning calorimetry graph of Ag-FB treated with DGEBF (a) 10 min, (b) 30 min and with DGEPG (c) 10 min, (d) 30 min at 150° C.
Figure 9:
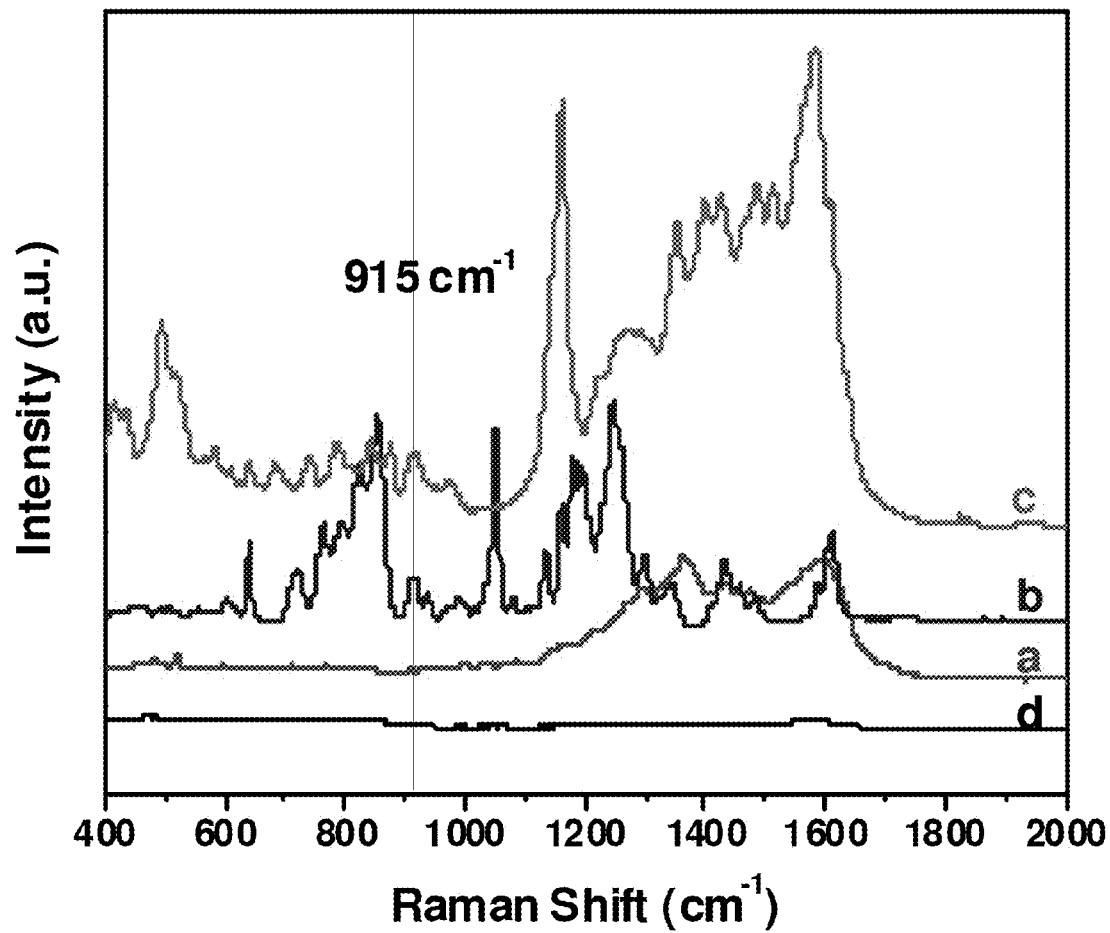
FIG. 9 is a Raman spectra of (a) the lubricant on the surface of Ag flakes (Ag-FB), (b) DGEBF, Ag flakes treated with (c) DGEBF and (d) DGEPG at 150° C.

FIG. 8 shows DSC of silver flakes (Ag-FB) treated with DGEBF or DGEPG. Ag-FB shows an exothermic peak and a mild broad peak at 276° C. after isothermal treatment with DGEBF for 10 and 30 min, respectively. The shift of the exothermic peak from 247° C., as shown in FIG. 5, to 276° C. can result from the physical absorption of DGEBF onto the surface of silver flakes that delays the oxidation of the lubricant. The physical absorption was verified by the peak at 915 cm$^{-1}$, shown in FIG. 9, data set (c), the characteristic vibration of epoxy rings, in the Raman spectrum of silver flakes treated with DGEBF.

After treatment with DGEPG, the exothermic DSC peak disappeared, shown in FIG. 8. Raman peaks of the lubricant on the surface of silver flakes almost disappeared, shown in FIG. 9, data sets (a) and (d). Both DSC and Raman results indicated that silver carboxylate on the surface of silver flakes was reduced and at least partially, if not fully, removed. This was consistent with the lack of luster on the surface of DGEPG treated silver flakes. It is known that organic molecules on the surface of silver particles play an important role in the sintering onsets, the extent of densification and final grain sizes. These organic molecules provide an energy barrier to sintering. The particles sinter if the thermal energy is sufficient to overcome the activation energy provided by the organic molecules. The nearly complete removal of the lubricant from the surface of silver flakes facilitated the sintering between silver flakes for DGEPG treated silver flakes and thus the electron transport.

Figure 10:
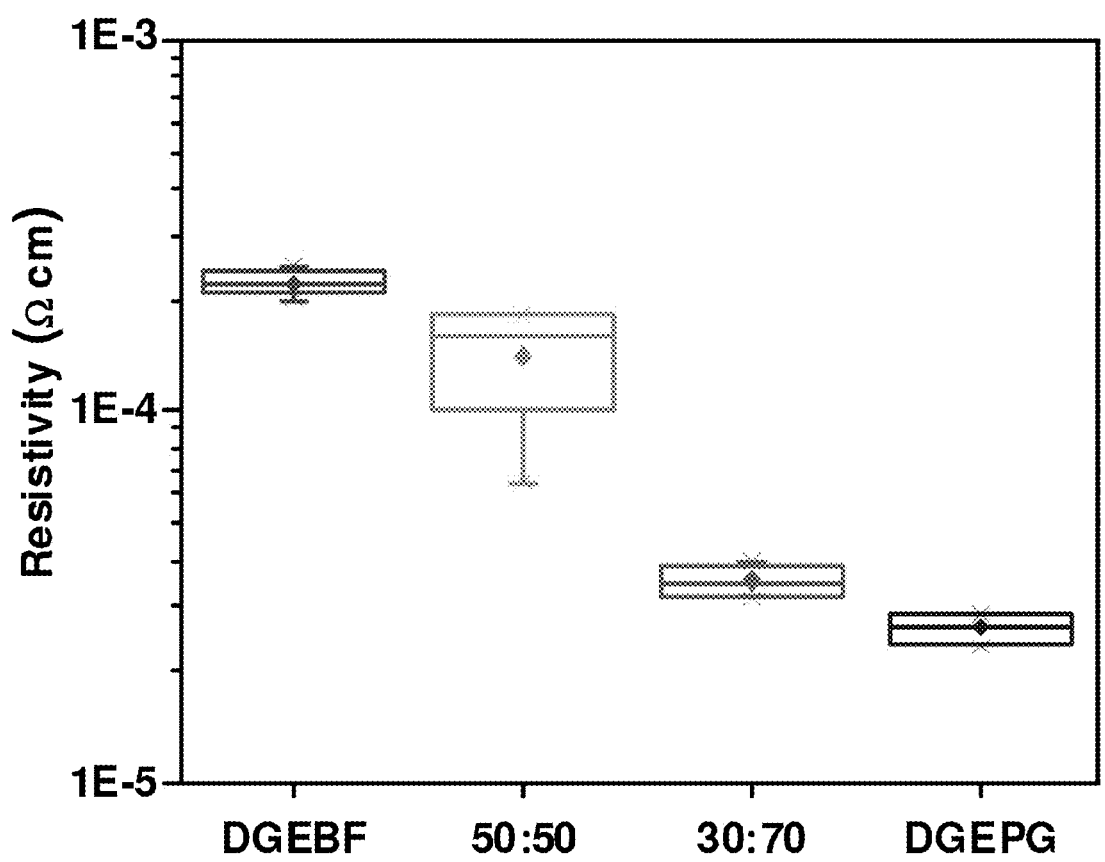
FIG. 10 illustrates the electrical resistivity of polymer composites filled with 80 wt % silver flakes by using different polymer matrices including DGEBF (100%), a 50:50 mixture of DGEBF and DGEPG, a 30:70 mixture of DGEBF and DGEPG, and DGEPG (100%).

Electrical conduction of a metal-filled epoxy-based polymer composite can be established through the cure shrinkage of the polymer matrix, which brings metal fillers into intimate contacts and forms 3-D conductive networks within the polymer matrix. FIG. 10 shows bulk resistivity of composites filled with 80 wt % silver flakes using different ratios of DGEBF and DGEPG as polymer matrices. DGEBF filled with 80 wt % silver flakes shows an averaged resistivity of $2.3 \times 10^{-4}$ Ωcm, which is comparable to that of commercially available electrically conductive adhesives. The averaged resistivity decreased to $1.4 \times 10^{-4}$ Ωcm and the lowest resistivity was $6.5 \times 10^{-5}$ Ωcm for the composites with equal amounts of DGEBF and DGEPG.

Figure 11:
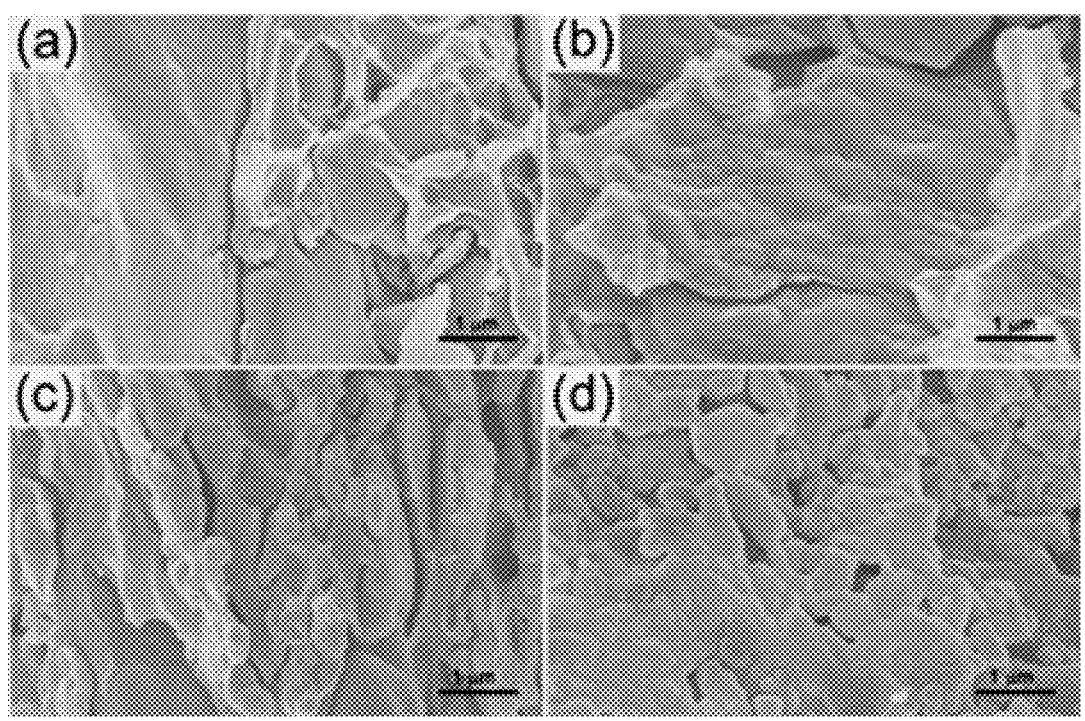
FIG. 11 are scanning electron microscope images of cross-sections of polymer composites filled with 80 wt % Ag flakes by using different polymer matrices (a) DGEBF (100%); (b) 50:50 mixture of DGEBF and DGEPG, (c) 30:70 mixture of DGEBF and DGEPG, (d) DGEPG (100%).

The polymer composites showed a lower electrical resistivity ($3.5 \times 10^{-5}$ Ωcm) with an increased DGEPG content (70 wt % of the mixture of DGEBF and DGEPG). This could be due to the enhanced reduction of silver carboxylate and increased necking area between silver flakes. The resistivity of the DGEPG filled with 80 wt % silver flakes is $2.5 \times 10^{-5}$ Ωcm, about one order of magnitude lower than that of the composites composed of DGEBF and 80 wt % silver flakes. FIG. 11 shows the cross-sections of the conductive polymer composites. Without DGEPG, the surface of silver flakes within the polymer matrix was relatively smooth, shown in FIG. 11a. There are lubricants (or possibly oxide) at the interface between silver flakes. The presence of the lubricants increases the tunneling resistance between silver flakes.

With the incorporation of DGEPG, silver nano/submicron-sized particles formed both on the surface and at the edges of the silver flakes, shown in FIG. 11b. As the content of DGEPG increased, larger particles and neckings between silver flakes formed, FIGS. 11c and 11d. Therefore, two factors contribute to the significantly improved electrical conductivity of the polymer composites with the incorporation of DGEPG. First, the growth of highly surface reactive silver nano/submicron-sized particles facilitates the sintering between silver flakes. The sintering leads to the formation of metallurgical joints and reduces or even eliminates the contact resistance effectively. Second, the removal of surface lubricant, as verified from FIG. 9, enables direct metal-metal contacts between silver flakes, decreasing the contact resistance.

Various embodiments of the present invention provide for highly conductive polymer composites that have been prepared by low temperature sintering (<200° C.) of silver flakes. Flexible, highly conductive polymer composites with electrical resistivity as low as $2.5 \times 10^{-5}$ Ωcm were prepared at 150° C. by incorporating flexible epoxy (DGEPG) into the composite formulation. DGEPG functioned as a mild reducing agent for the in situ reduction of silver carboxylate on the surface of silver flakes. The reduction of silver flakes by DGEPG removed the surface lubricant and allowed the metallurgical joints and direct metal-metal contacts between the conductive fillers. This reduced or even eliminated the contact resistance effectively, enabling the preparation of flexible highly conductive polymer composites at a low temperature.

The approach developed offers many significant advantages such as i) reduced materials cost, as in some examples, there is no need to incorporate pre-fabricated nanoparticles to improve electrical conductivity; ii) low processing temperature compatible with low cost, flexible substrates such as paper and PET; iii) simple processing; and iv) low viscosity of the formulated pastes with DGEPG, allowing them to be used for low cost jet-dispensing technologies; v) tunable mechanical properties; and vi) flexibility and high electrical conductivity. Future printed electronics require the epoxy-based polymer composites to be mechanically compliant to fit the non-planar forms, to have a high conductivity, to have strong adhesion on many substrates and to have low processing temperatures to be compatible with low cost, flexible substrates. The multi-functional polymer composites developed in this study are attractive for current and emerging applications in flexible electronics such as, for example, printed electro-active composites.

Laboratory Experiments and Results (II)

Figure 12:
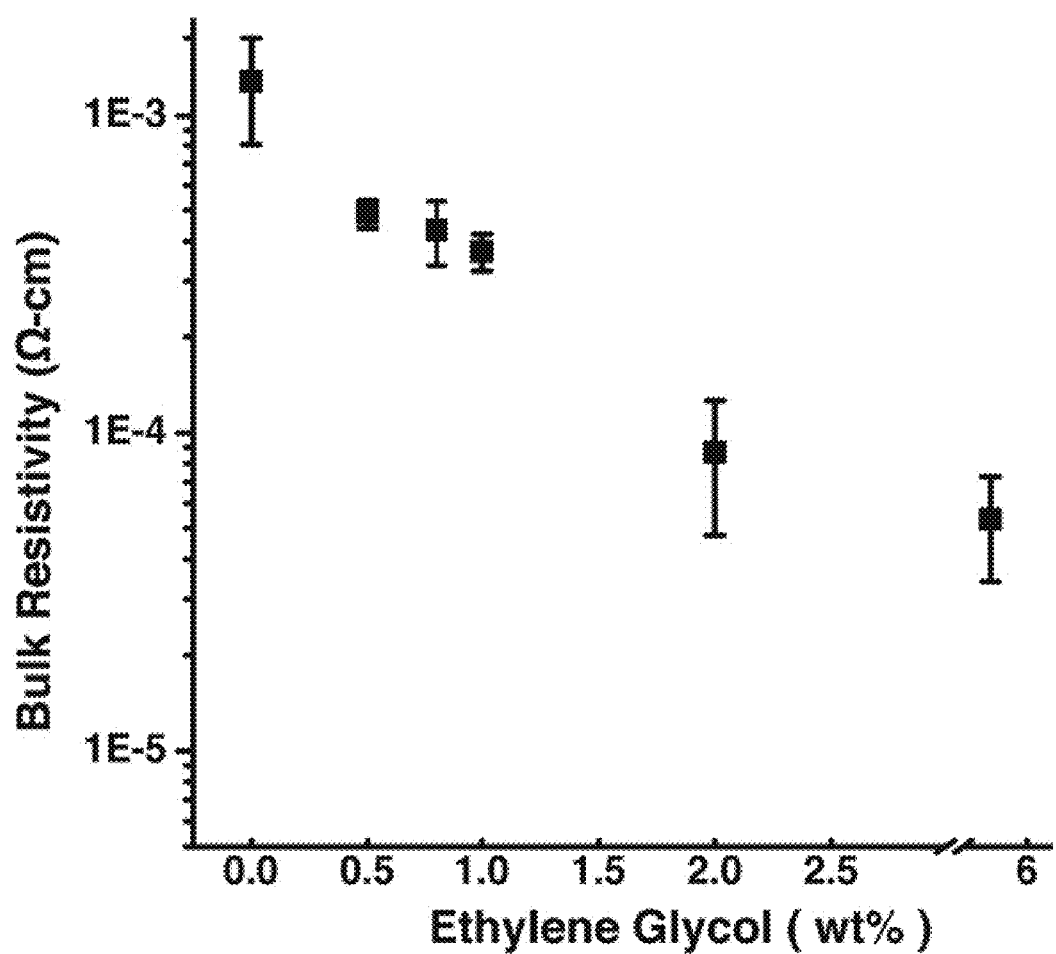
FIG. 12 illustrates the effect of ethylene glycol on the electrical resistivity of conductive polymer composites filled with 80 wt % silver flakes.
Figure 13:
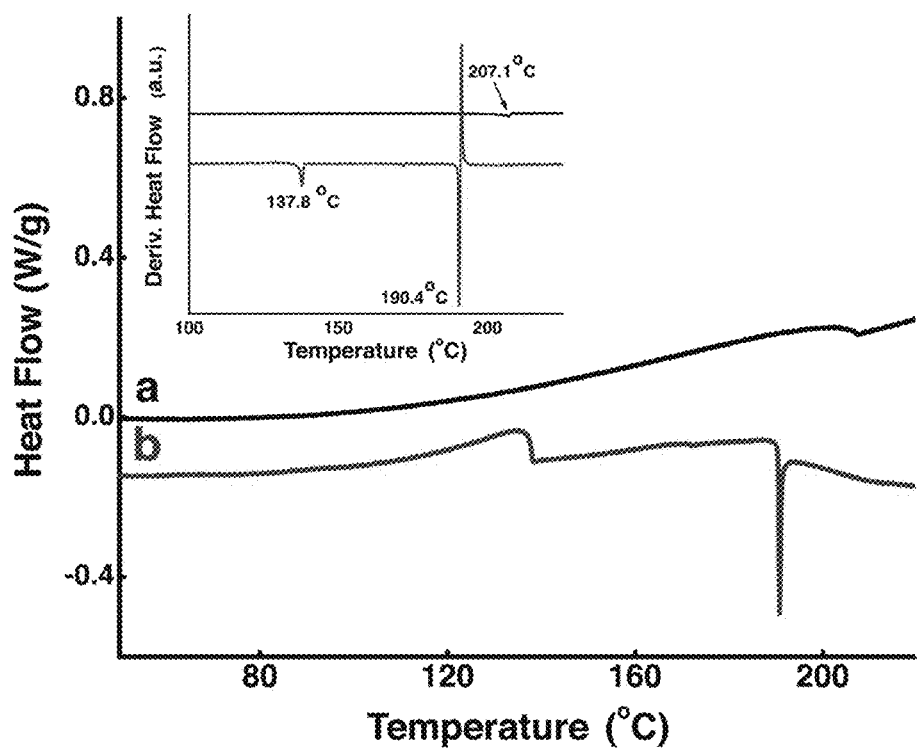
FIG. 13 are differential scanning calorimetry curves of (a) silver flakes and (b) silver flakes with ethylene glycol.
Figure 13A:
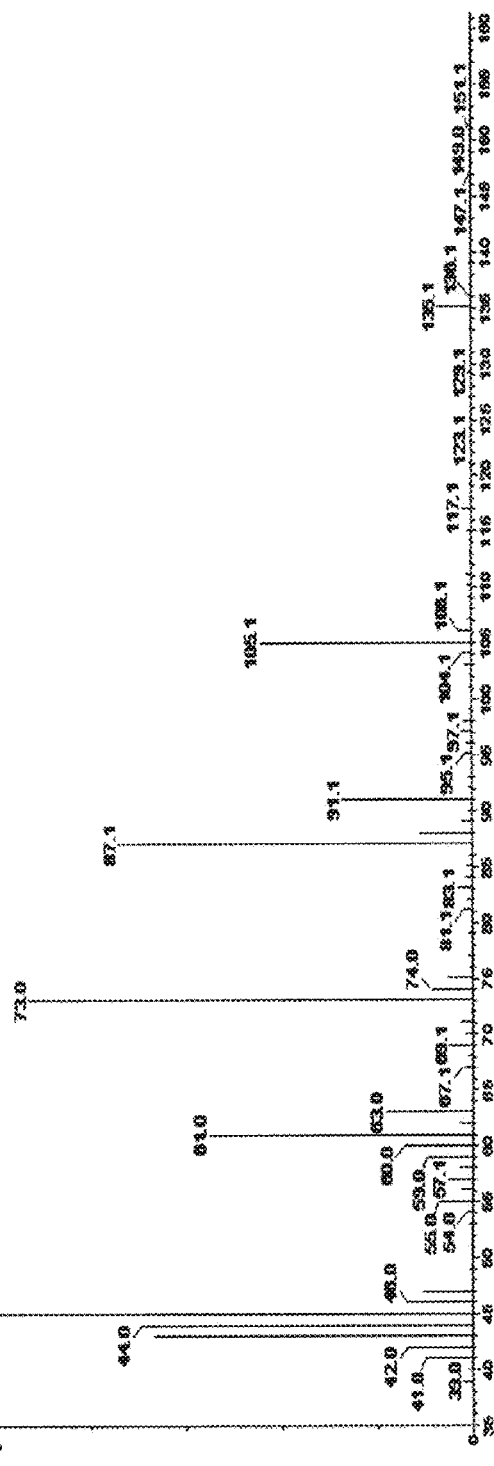
FIG. 13a is a mass spectrum of the supernatant from the reaction mixture of EG and silver flakes.

A reducing agent is used as an additive to enhance the conductivity of the ECC. The electrical resistivity of ECC prepared with EG concentrations in the polymer matrix up to 5 wt % is shown in FIG. 12. The ECC with 5 wt % EG has a resistivity of $5.3(\pm 1.9) \times 10^{-5}$ Ωcm, 3.86% of the resistivity of ECC without EG. The measured resistivity is about one order of magnitude lower than commercial conductive polymer composites filled with similar filler loadings of 80 wt % Ag flakes. The reaction between silver salts of fatty acids and EG was verified by DSC, as shown in FIG. 13. Without EG, the decomposition of silver salts of fatty acids occurs at 207.1° C., indicated by the exothermic peak in FIG. 13. With EG, the exothermic peak downshifts to 137.8° C., indicating that EG facilitates the reduction of silver salts of fatty acids. It is well known that silver (silver flakes in this case) can catalyze EG oxidation to glycolaldehyde and glyoxal. FIG. 13a is a mass spectrum of the supernatant collected from the reaction mixture of EG with silver flakes at 150° C. The mass spectrum shows the presence of acetaldehyde, diacetyl, glycolaldehyde, glyoxal, glycolic acid, glyoxilic acid and oxalic acid, providing evidence that EG reduces the silver salts of fatty acids on the surface of the silver flakes at 150° C. Table 1 below further explains the mass spectrum of FIG. 13a.

TABLE 1

Assignment of m/z in the mass spectrum of the supernatant from the reaction mixture of EG and silver flakes.

| m/z | Formula | Chemical Name |
|---|---|---|
| 90 | HOOC—COOH | Oxalic acid |
| 87 | CH$_3$CO—COCH$_3$ | Diacetyl |
| 77 | HOOC—CH$_2$OH | Glycolic acid |
| 75 | HOOC—CHO | Glyoxylic acid |
| 60 | OHC—CH2OH | Glycoaldehyde |
| 58 | OHC—CHO | Glyoxal |
| 45 | OHC—CH$_3$ | Acetaldehyde |

Figure 14:
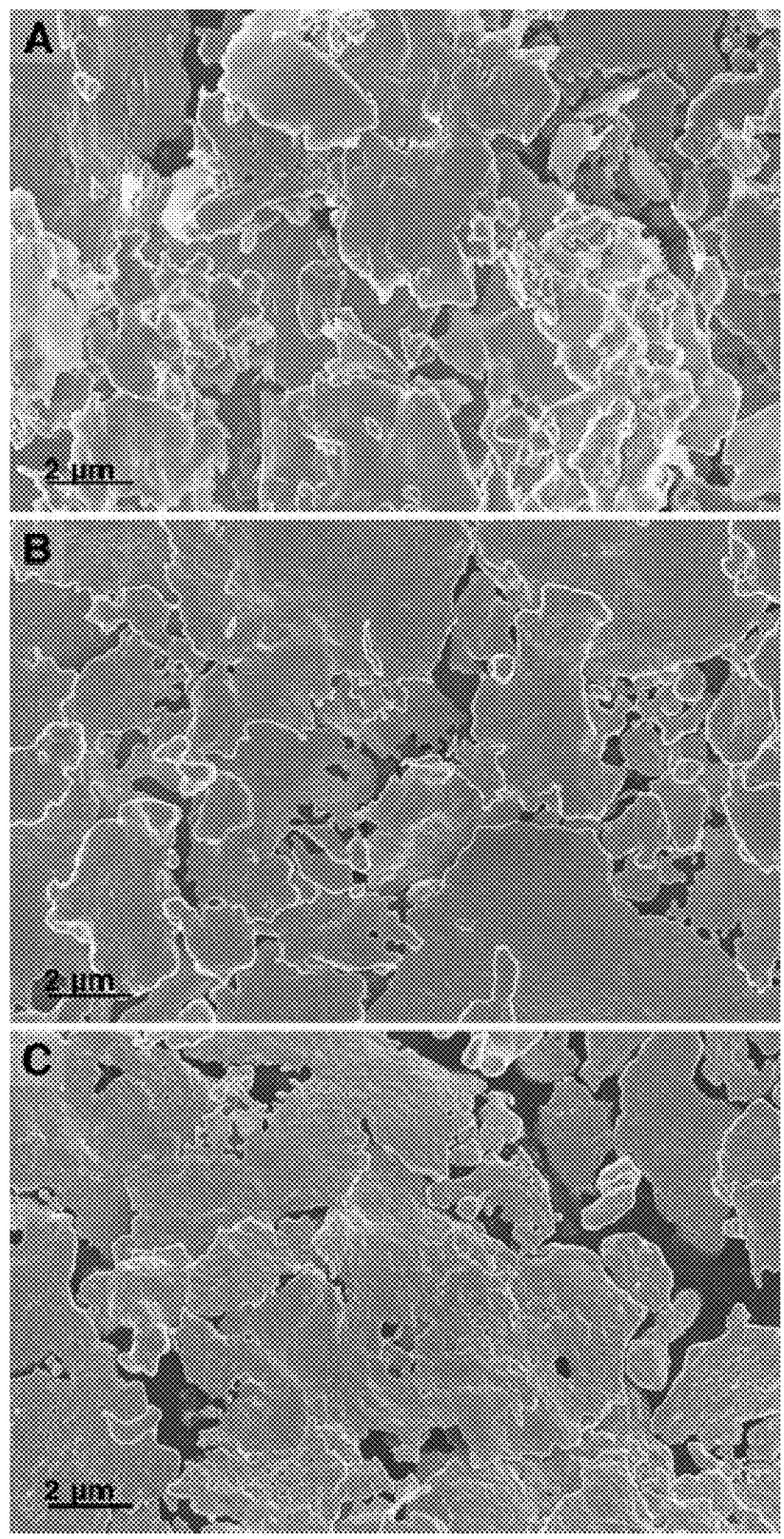
FIG. 14 are scanning electron microscope images of silver flakes (A) untreated, (B) treated with EG at 150'C for 10 min, and (C) treated with EG at 150'C for 30 min.

To observe the sintering process, low-temperature sintering of silver flakes using EG was achieved at 150° C. FIG. 14 shows the SEM images of untreated silver flakes and silver flakes treated with EG for 10 min and 30 min at 150° C. Compared to the untreated silver flakes, silver flakes treated with EG for 10 min show metallurgical bridges between silver flakes. These metallurgical bridges develop as colloidal silver formed during the reduction reaction sinters with adjacent Ag flakes. Increasing the flake treatment time to 30 min causes edge-by-edge sintering between silver flakes.

Figure 15:
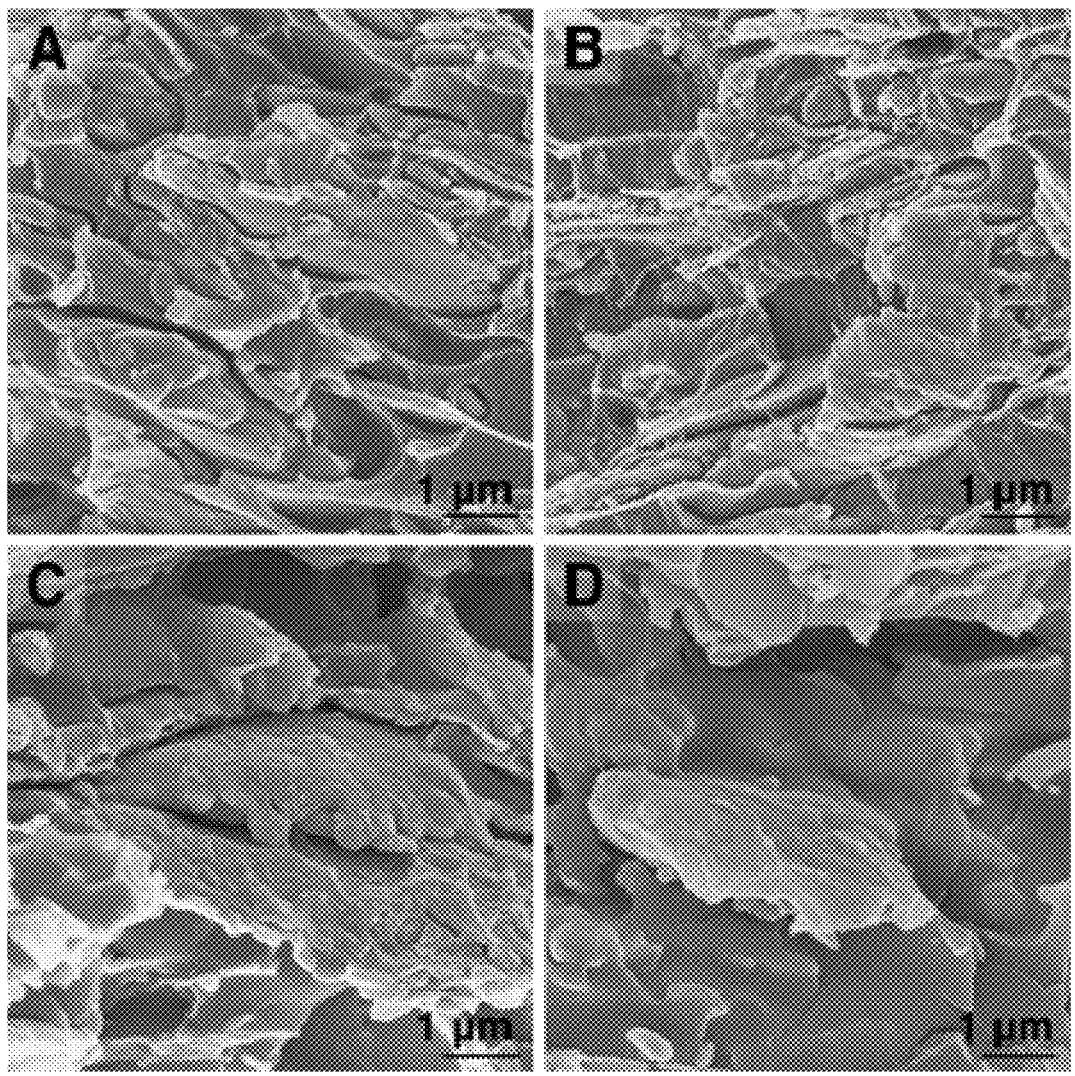
FIG. 15 are scanning electron microscope images of the cross-sections of the ECC with EG (A) 0 wt %, (B) 0.5 wt %, (C) 2 wt %, and (D) 5 wt %.

To demonstrate that sintering of silver flakes is achievable while within an epoxy matrix, SEM of cured ECC with EG concentrations of 0, 0.5, 2 and 5 wt % is shown in FIG. 15. With addition of 0.5 wt % EG, no significant morphological change was observed compared to the ECC without EG. However, the morphology of the composite changes significantly when increasing the concentration of EG to 2 wt %. As seen in the SEM images of the ECC with 2 and 5 wt % EG in FIGS. 15C and 15D, it appears that the epoxy resin has adsorbed on the surface of the silver flakes. This change in morphology of the composite is observed because during curing, EG removes the surfactant from the surface of the silver flakes, leaving the silver flake surface bare. The bare silver flake surface has a very high surface energy, thus the epoxy resin in the composite readily adsorbs on the silver surface.

This edge-by-edge sintering results in much wider metallurgical bridges, dramatically reducing contact resistance. The reduction in contact resistance translates to significant increase in electrical conductivity of the ECC. In addition, EG can also reduce silver oxide, which can be present on the surface of silver flakes. The reduction of silver oxide possibly present on the surface of silver flakes to metallic silver can also contribute to the enhanced electrical conductivity of ECC prepared with EG.

Exemplary Uses

Increasing the conductivity of ECC can significantly reduce resistive losses, enabling the fabrication of low-cost, simple and efficient RF devices. Increasing the conductivity of ECC would enable the fabrication of low-cost RF devices, which could be used in a wide variety of sensory and communication applications.

Figure 16:
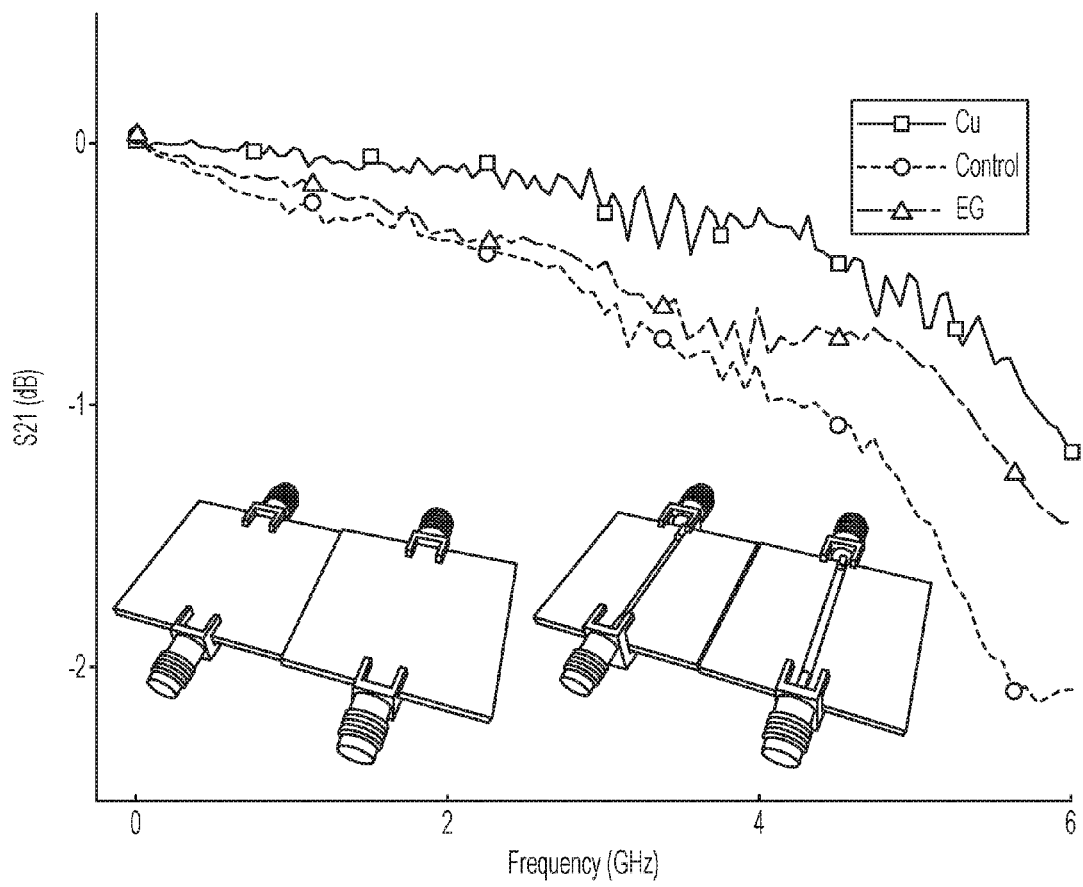
FIG. 16 illustrates the S-parameters of 50Ω Cu line and ECC microstrip lines. Inset shows the signal and ground planes of the microstrip lines used for high frequency measurements.
Figure 17A:
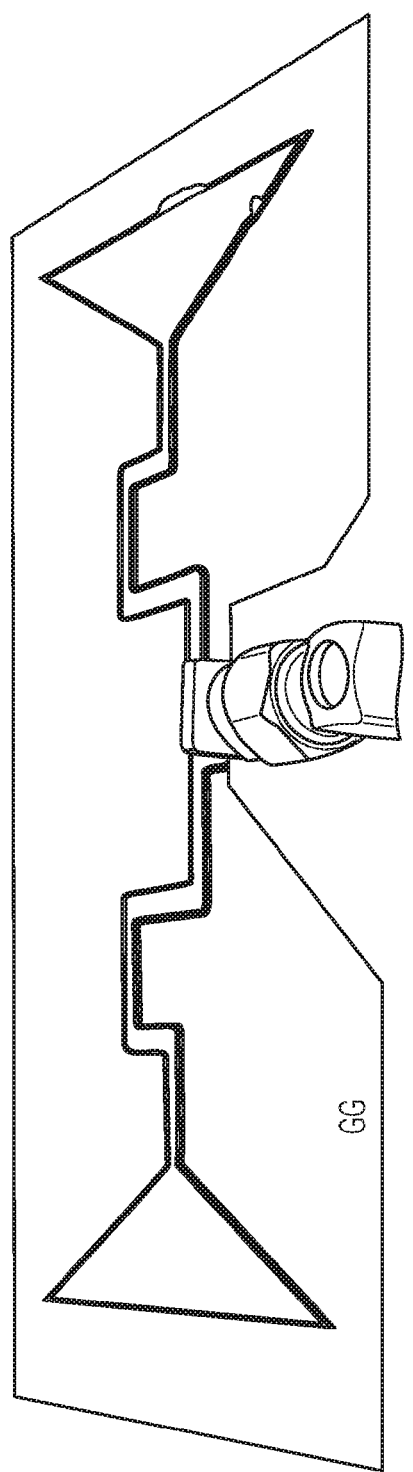
FIG. 17 are antenna measurements showing (A) picture of the fabricated antenna in the chamber setup (B) measured efficiency (C) measured vs. simulated 2D radiation pattern (D) measured 3D radiation pattern.
Figure 17B:
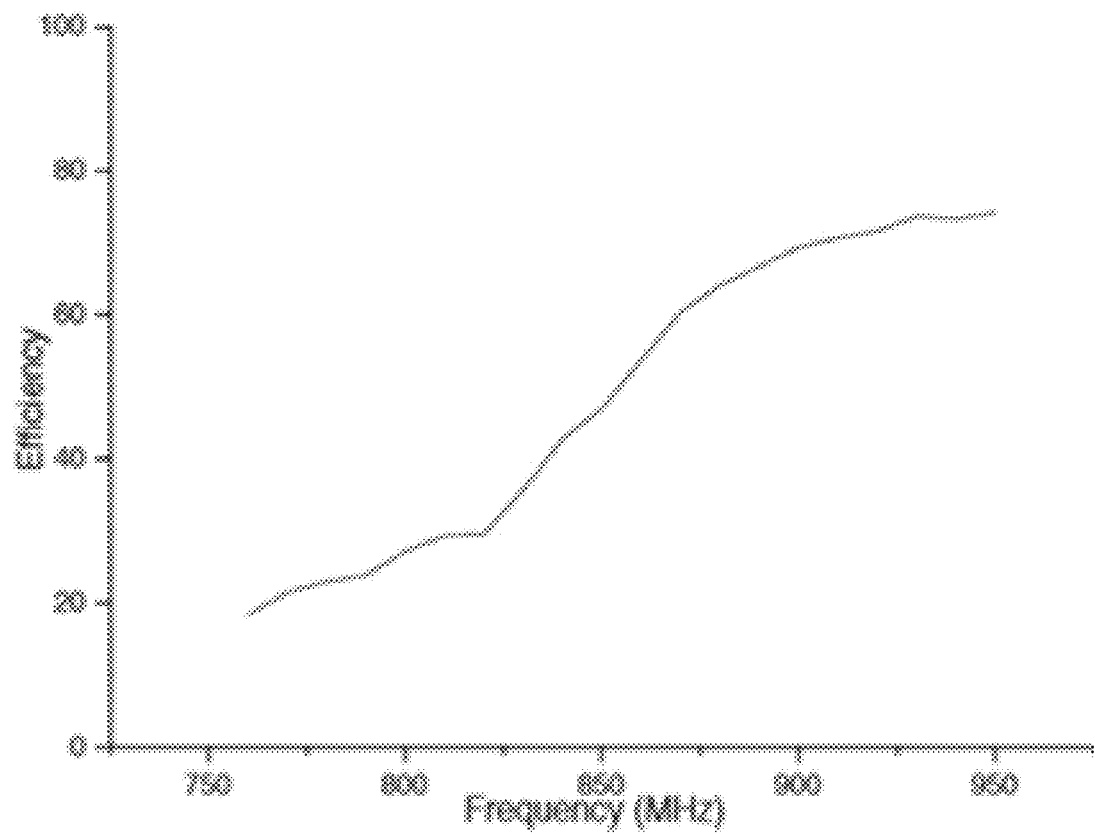
Figure 17C:
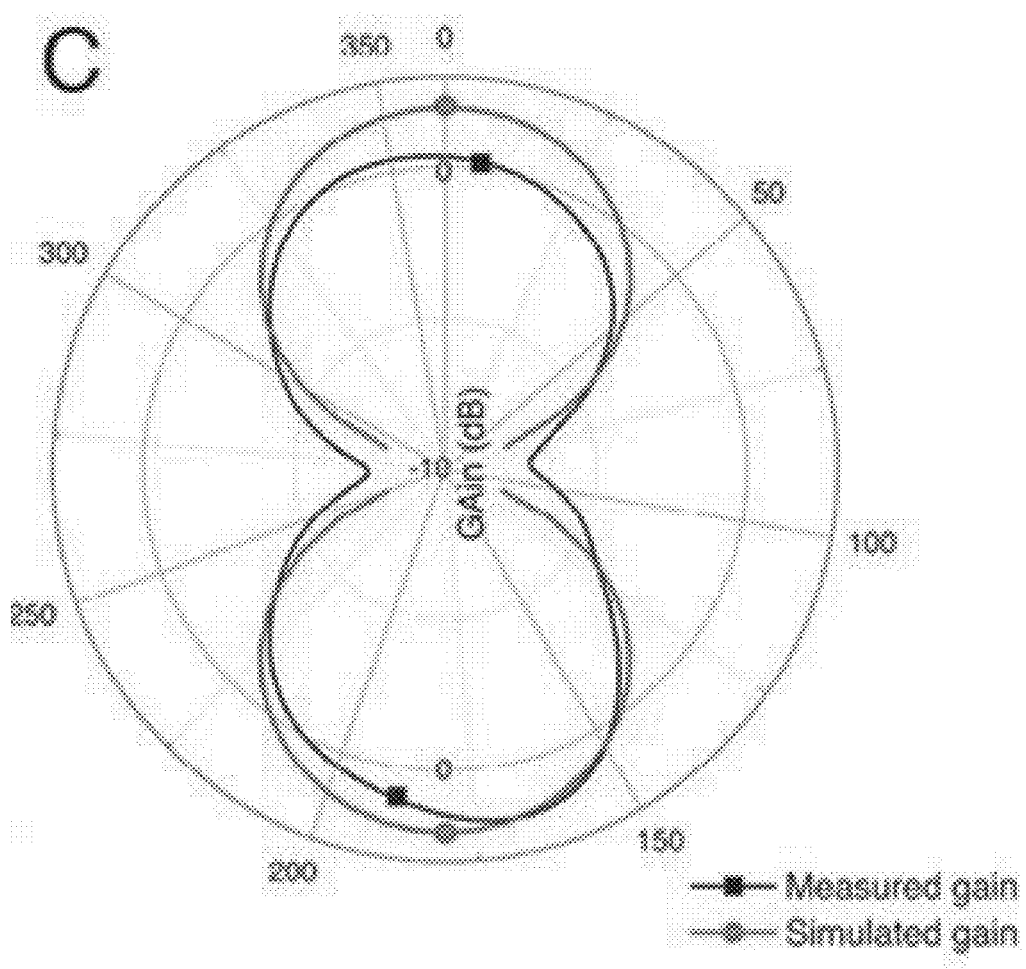
Figure 17D:
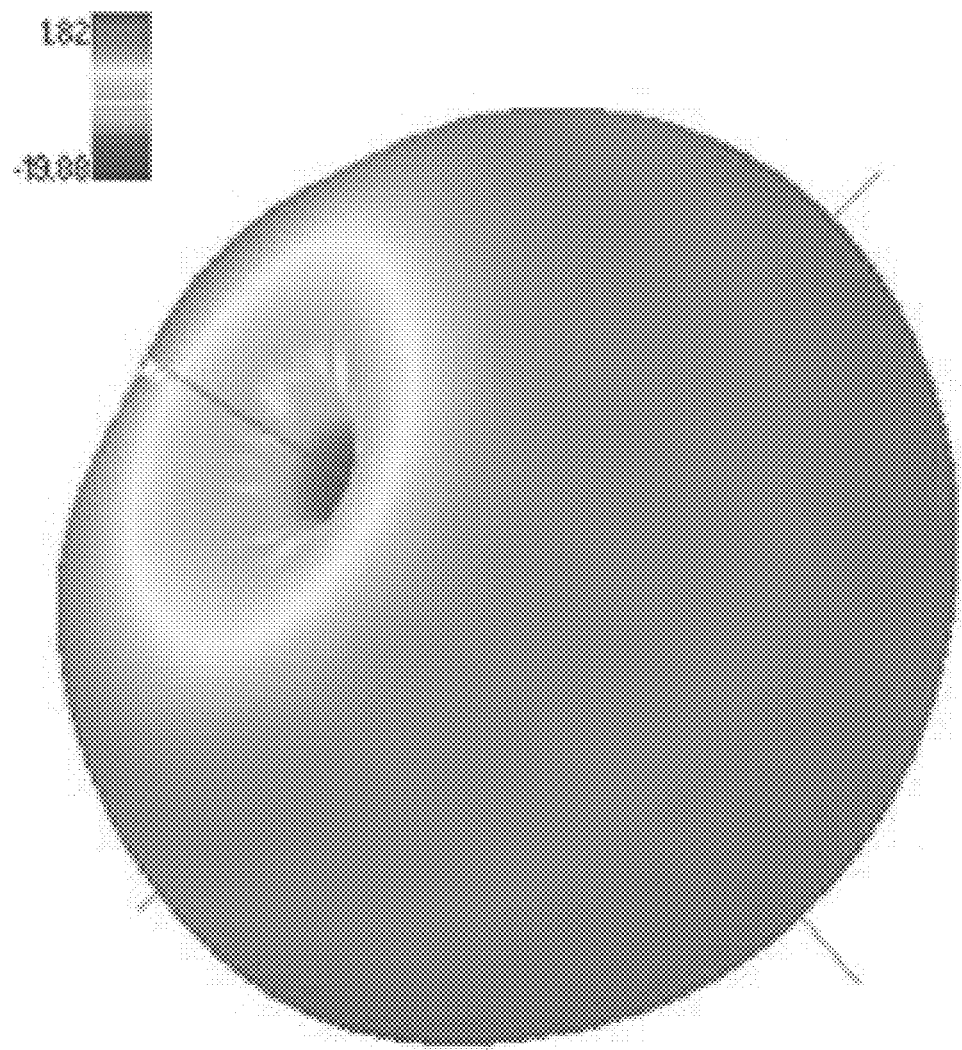

To show the effect of the EG on the RF performance of ECC, microstrip transmission lines were fabricated and tested as described in the experimental methods. Transmission lines were fabricated on TMM10 high frequency ceramic polymer composite substrate (Rogers Corp.), with a relative dielectric constant of 9.2 and loss tangent of 0.0022 at 10 GHz. The microstrip lines were designed using a transmission line calculator to have a characteristic impedance of 50Ω, with both the signal and the ground plane made of the same material, as shown in FIG. 16. For comparison, an identical reference Cu line was fabricated. The S-parameters of the microstrip lines from 100 MHz to 6 GHz were measured with an E8364B PNA Network Analyzer using a SOLT calibration.

The S-parameters of the microstrip lines are shown in FIG. 16. ECC microstrip lines show good performance compared to Cu at up to 6 GHz. The ECC without EG has an insertion loss of 0.16 dB/cm more than the line without EG at 6 GHz.

To demonstrate the practicality of composites according to various embodiment of the present invention in wireless communications, a half wavelength dipole antenna was fabricated. Half wavelength dipole antennas are simple radiators consisting of two collinear conductors each measuring a quarter of the operating wavelength, with a small gap between them. The dipole antennas are fed in the center by applying radio frequency voltage between the two conductors. Dipoles are omnidirectional antennas, with maximum gain in the plane perpendicular to the antenna and zero gain in the direction of the wires. The main challenges in designing dipole antennas in the ISM frequency band (902 to 928 MHZ) for consumer applications like RFID tags and wireless sensor networks are miniaturization and large bandwidth.

To achieve miniaturization and large bandwidth, a folded bow-tie meander line dipole antenna was designed using the full wave HFSS simulator. The meander line enables the miniaturization of the antenna structure, while the bow tie shape at the end of the lines improves the antenna bandwidth. Antennas were designed and fabricated on Rogers TMM-3 substrate, with a dielectric constant of 3.27 and loss tangent of 0.002. These antennas were fabricated by stencil printing ECC onto the TMM-3 substrate using a using a flat plate stencil 200 µm thick (Mini Micro Stencil Inc.) and then cured at 150° C. for 60 minutes.

The fabricated antenna is shown in FIG. 17. The 3D radiation pattern of the fabricated antenna was tested using a Stargate 64 antenna chamber. It was found that the antenna fabricated had a maximum gain of 1.81 dB with an efficiency of 74.63% at a frequency 930 MHz. Comparison of the measured radiation pattern showed excellent agreement to the simulation as shown in FIG. 17. Moreover, the measured 3D radiation pattern of the antenna fabricated showed a standard donut shaped radiation pattern expected for dipole antennas.

Printable low-cost composite materials which can be processed at low-temperature enable a new way to integrate wireless communication systems on pre-existing products with minimal impact on the form factor or function. The composite material developed is low cost, simple to process, mechanically robust, flexible and easy to print via stencil, screen or roll-to-roll processes. Furthermore, the composite developed has adhesive properties enabling it to be used to directly connect to sensory devices or other integrated circuits. The simple fabrication, excellent mechanical properties and RF-performance is unmatched by any current materials or processes.

To the materials and processes of the present invention, a large quantity of antennas was fabricated. An array of antennas printed is shown in FIG. 18a. The fabrication process is highly scalable, enabling it to be used in a plethora of low cost consumer devices. As an example, a similar but smaller antenna designed to resonate at 1.8 GHz on band-aids purchased from a local store was fabricated. After printing and curing the composite 150° C. for 1 hour, the band-aids were undamaged and the adhesive backing was still intact.

Antennas were successfully printed on a wide variety of band-aids including: plastic, sheer, fabric, etc. The antenna printed on the band-aid from 1 GHz to 2.5 GHz with an E8364B PNA Network Analyzer using a SOLT calibration was tested. The antenna showed a resonance at 1.9 GHz, close to the designed resonance frequency of 1.8 GHz. Because the conductive composite is flexible, the band-aid antenna was attached to the curvilinear surface of the human body. An antenna attached to a person's wrist was tested. Due to the higher dielectric constant of the human body compared to air, the resonance frequency of the antenna shifted significantly to 1.58 GHz, shown in FIG. 18b. This shift in resonance frequency due to the higher dielectric constant of the human body compared to air can be simulated and accounted for when designing antennas.

Various embodiments of the present invention enable antennas to be fabricated on pre-existing products with minimal additional processing steps. Typically an antenna could be printed onto a textile or fabric surface in a three step process: 1. ECC preparation; 2. printing of antenna; 3. curing. The integration of small sensory devices and power generation/harvesting systems would enable the mass production of low-cost minimally invasive sensors capable of communicating with wireless body area networks.

In summary, various embodiments of the present invention provide for a relatively simple method to significantly decrease the electrical resistivity of ECC by in-situ nano-particle formation and sintering using EG. Microstrip transmission lines were fabricated to test the RF performance of the ECC. Due to the lower resistivity, the lines built with ECC with EG have a much lower insertion loss than the lines built with ECC without EG. Using ECC of the present invention, it is possible to rapidly fabricate highly efficient dipole antennas on a wide variety of substrates including commercially available band-aids. This approach offers significant advantages such as reduced materials cost, simple processing and low processing temperature compatible with low cost polymer substrates such as paper and fabric. The developed highly conductive ECC is attractive for use in emerging printed electronics and low cost radio frequency devices.

While the invention has been disclosed in its exemplary forms, it will be apparent to those skilled in the art that many modifications, additions, and deletions can be made therein without departing from the spirit and scope of the invention and its equivalents, as set forth in the following claims.

We claim:

1. A method of making a conductive adhesive comprising a polymer matrix and a plurality of silver flakes, the method comprising:
   adding a reducing agent to grow surface reactive silver nano/submicron-sized particles on at least a portion of a surface of and/or an edge of a least a portion of the plurality of silver flakes to facilitate in situ sintering between a portion of the plurality of silver flakes; and
   forming metallurgical joints between at least a portion of the silver flakes;
   wherein the reducing agent is a flexible epoxy selected from the group consisting of diglycidyl ether of polypropylene glycol and diglycidyl ether of polyethylene glycol.

2. The method of claim 1 further comprising removing at least a portion of surface lubricant from at least a portion of the surface of the plurality of silver flakes.

3. The method of claim 1 further comprising curing the polymer matrix at a temperature range of approximately 150° C. to approximately 200° C.

4. The method of claim 1 further comprising curing for approximately 30 minutes to approximately 1 hour.

5. The method of claim 1, wherein the weight % of the plurality of silver flakes in the polymer composite is in the range of 60-90 weight %.

6. The method of claim 1, wherein the conductive adhesive has an electrical resistivity of approximately $10^{-5}$ $\Omega$cm.

7. The method of claim 1, wherein the conductive adhesive is stencil printable.

8. The method of claim 1, wherein the conductive adhesive is a flexible composite.

9. A method of making a conductive adhesive comprising a polymer matrix and a plurality of silver flakes having a surface lubricant on a portion of a surface of at least a portion of the silver flakes, the method comprising:
   adding a reducing agent to a polymer matrix and a plurality of silver flakes to grow surface reactive silver nano/submicron-sized particles on at least a portion of a surface of and/or an edge of a least a portion of the plurality of silver flakes to facilitate in situ sintering between a portion of the plurality of silver flakes;
   forming metallurgical joints between at least a portion of the silver flakes;
   reducing at least a portion of surface lubricant from at least a portion of the surface of at least a portion of the plurality of silver flakes; and
   curing the polymer matrix for approximately 30 minutes to approximately 1 hour at a temperature range of approximately 150° C. to approximately 200° C.;
   wherein the weight % of the plurality of silver flakes in the polymer composite is in the range of approximately 60-90 weight %; and
   wherein the reducing agent is a flexible epoxy selected from the group consisting of diglycidyl ether of polypropylene glycol and diglycidyl ether of polyethylene glycol.

10. The method of claim 9,
wherein the weight % of the reducing agent is in the range of 0.5-20 wt %; and
wherein the weight % of the plurality of silver flakes in the polymer composite is in the range of 70-85 weight %.

11. The method of claim 10, wherein the conductive adhesive has an electrical resistivity of approximately $10^{-5}$ Ωcm.

12. A method of making a conductive adhesive comprising a polymer matrix and a plurality of silver flakes, the method comprising:
adding a reducing agent to grow surface reactive silver nano/submicron-sized particles on at least a portion of a surface of and/or an edge of a least a portion of the plurality of silver flakes to facilitate in situ sintering between a portion of the plurality of silver flakes; and
forming metallurgical joints between at least a portion of the silver flakes;
wherein the reducing agent is flexible epoxy; and
wherein the weight % of the flexible epoxy is in the range of 5-20 wt %.

13. The method of claim 12 further comprising removing at least a portion of surface lubricant from at least a portion of the surface of the plurality of silver flakes.

14. The method of claim 12 further comprising curing the polymer matrix at a temperature range of approximately 150° C. to approximately 200° C.

15. The method of claim 12 further comprising curing for approximately 30 minutes to approximately 1 hour.

16. The method of claim 12, wherein the weight % of the plurality of silver flakes in the polymer composite is in the range of 60-90 weight %.

17. The method of claim 12, wherein the conductive adhesive has an electrical resistivity of approximately $10^{-5}$ Ωcm.

18. The method of claim 12, wherein the conductive adhesive is stencil printable.

19. The method of claim 12, wherein the conductive adhesive is a flexible composite.

* * * * *